US010849351B2

(12) United States Patent
Kawashima et al.

(10) Patent No.: US 10,849,351 B2
(45) Date of Patent: Dec. 1, 2020

(54) RICE WASHER

(71) Applicant: Tiger Kawashima Company Limited, Gunma (JP)

(72) Inventors: Seizo Kawashima, Gunma (JP); Fumitaka Sekiguchi, Gunma (JP); Yuji Shimizu, Gunma (JP); Tomohiro Iizuka, Gunma (JP); Satoru Imura, Gunma (JP)

(73) Assignee: TIGER KAWASHIMA COMPANY LIMITED, Gunma (JP)

( * ) Notice: Subject to any disclaimer, the term of this patent is extended or adjusted under 35 U.S.C. 154(b) by 322 days.

(21) Appl. No.: 16/027,375

(22) Filed: Jul. 5, 2018

(65) Prior Publication Data

US 2019/0014809 A1    Jan. 17, 2019

(30) Foreign Application Priority Data

Jul. 14, 2017   (JP) .................................. 2017-138622

(51) Int. Cl.
| | |
|---|---|
| *A23N 12/02* | (2006.01) |
| *B08B 3/14* | (2006.01) |
| *B08B 3/02* | (2006.01) |
| *B08B 3/04* | (2006.01) |
| *B08B 7/02* | (2006.01) |

(52) U.S. Cl.
CPC ................ *A23N 12/02* (2013.01); *B08B 3/02* (2013.01); *B08B 3/042* (2013.01); *B08B 3/14* (2013.01); *B08B 7/02* (2013.01)

(58) Field of Classification Search
CPC ...................................................... A23N 12/02
See application file for complete search history.

(56) References Cited

U.S. PATENT DOCUMENTS 5,119,721 A  *  6/1992  Satake ...................... B02B 1/06
99/519

FOREIGN PATENT DOCUMENTS

| JP | H5-192594 A | 8/1993 |
| JP | 2009-248016 A | 10/2009 |

* cited by examiner

*Primary Examiner* — Jason Y Ko
(74) *Attorney, Agent, or Firm* — Hauptman Ham, LLP

(57) ABSTRACT

A rice washer includes a charging part into which milled rice is charged; a pressurized-stirring part which is provided at a rear-stage of the charging part and stirs and sequentially feeds the milled rice charged from the charging part under pressure; and a rinsing and stirring part which is provided at a rear-stage of the pressurized-stirring part and rinses the milled rice sent from the pressurized-stirring part while stirring.

7 Claims, 9 Drawing Sheets

RICE WASHER

CROSS-REFERENCE TO RELATED APPLICATION

This non-provisional application claims priority under 35 U.S.C. § 119(a) from Japanese Patent Application No. 2017-138622, filed on Jul. 14, 2017, the entire contents of which are incorporated herein by reference.

BACKGROUND

Technical Field

The present invention relates to a space-saving rice washer capable of automatically and continuously washing milled rice which has been charged.

Background Art

In rice (milled rice) which has been subjected to a processing step (rice-milling) of extracting only endosperm from brown rice, bran ingredients (aleurone layer) adhere (coat) to a surface of an endosperm (white rice) so as to be coated. When the milled rice coated with the bran ingredients is cooked as it is, it becomes a little yellow due to the repellent ingredient (the aroma ingredient) in the coated bran ingredients, and it does not become delicious rice.

Further, in rice cooked without washing rice by a hot water cooking method, a lot of bran with oil-and-fat oxidation product ingredient, dirt, fungus odor, and the like generated by this savory ingredient and storage of milled rice remain. Such rice is unsuitable for dishes in which the taste of rice itself stands out, such as sushi (shari) rice, rice balls, rice for Japanese cuisine. In other words, in order to obtain delicious rice, the quality of the rice washing operation before rice cooking is extremely important and indispensable operation.

Here, in order to carry out the rice washing, water is added to the milled rice and pressurized and stirred, and a state (a frictional separation effect) in which rice grains pass lightly while coming into contact with each other under a situation in which there are the rice grains, water, and air gap is desirably added. Therefore, "rice-polishing" for peeling off the coating ingredient from the rice grain and "rice-rinsing" for diluting, separating, and releasing the coating ingredient separated from the rice grains are performed. Generally, this "rice-polishing" and "rice-rinsing" operations are indispensable for washing rice. In the present specification, this "rice-polishing" is referred to as "polishing" and "rice-rinsing" is referred to as "rinsing".

As a device for washing the milled rice, JP 2009-248016 A discloses a rice washer in which rice washing is performed, and the whole amount of milled rice is charged into a rice washing tank, and is washed with a stirring rod by supplying water. However, with such a rice washer using a stirring rod, the finish of the rice washing becomes incomplete. In other words, the substance to be removed by washing rice has glue properties like a glue or an adhesive as physical properties as it is called a starch layer bran (aleurone layer), and in the rice washer using a stirring rod described in JP 2009-248016 A, since it is not possible to obtain an appropriate pressure necessary for polishing rice, it is not possible to sufficiently remove such a starch layer bran (aleurone layer).

In order to firmly remove the starch layer bran from the rice grain, a frictional separation from rice grain using water, and its separation removal are indispensable operations. Specifically, the rice-polishing is performed, by pouring water into milled rice, rounding water once and discarding the water, and mixing (stirring) the rice grains only in wet rice grains. In the rice-polishing, the slow speed difference between rice grains or the space air promotes the mutual contact of the grains and adds strong powerful frictional separation (polishing) action to the rice grains. This state is performed for a few seconds, water is added again (in a state in which the rice grains float in water), and lightly stirred (rinsing/separating dilution). Further, water is discarded (separation removal), and the rice grains are stirred again with wet rice grain (rice-polishing). Furthermore, water is added and slightly stirred (rinsing/separating dilution). The operation is performed at least three times.

Here, even when a stirring mixing action is applied to the rice grains fully submerged in water and sunk, the frictional separation effect between the rice grains does not work at all and it is not possible to wash the rice. That is, the polishing action does not work. On the other hand, when water is discarded and stirring is performed in a state in which the rice grains are sufficiently wet, a frictional separation effect works between the rice grains that do not accept buoyancy by water, and it is possible to polish the rice.

Further, by adding water, the polished dirt ingredients are diluted, separated and discarded (rinsed), the rice water ratio is adjusted at the end, and the rice cooker is switched on. To obtain delicious rice, even in a small amount of rice cooking, the above-mentioned rice-washing (rice-polishing+rice-rinsing) is an indispensable work process.

In the rice washer using the stirring rod, it is not possible to sufficiently perform the rice-washing work indispensable for obtaining delicious rice in this way. In addition, with peeling force of the extent of polishing with a brush without using water, it is not possible to wash and remove paste-like substances from rice grains by peeling off or separating the paste-like substances.

JP H5-192594 A describes a wash-free rice producing apparatus that pressurizes and stirs milled rice while conveying milled rice with a screw blade. This wash-free rice producing apparatus can provide a frictional separation effect, and is highly effective for removing the starch layer bran from the rice grains as compared with a brush-polishing rice washer.

SUMMARY OF THE INVENTION

Problems to be Solved by the Invention

Rice with a small amount used in household (for example, about 0.14 kg to 2.9 kg) does not cause problems in manually washing the rice. However, in the case of boiled rice cooked rice (about 3 kg or more) of stores, companies, schools, etc., when rinsing with human hands, troubles due to the physical properties of rice grains are likely to occur.

That is, in the rice-washing, the rice-polishing and rice-rinsing works have a very limited time (in the order of ten seconds). The extremely limited time in the rice-washing is due to water absorption characteristics inherent to the rice grain and softening brittleness of starch grain characteristics of rice grain-based main ingredient.

In general, for rice cooking of about 3 kg or more, rice washers of mechanical circulation lot batch type or water flow stirring circulation batch type are mainly used. However, these machines are difficult to operate, the water flow type requires considerably useless tap water or requires a large-sized air compressor, etc., which causes a problem of impairing simplicity and convenience.

Further, in the automatic rice washer, a rice-washing method of agitating under floating water close to non-pressurization is a main stream, taking longer time of rice-washing. In this case, it is not possible to obtain the frictional separation effect between the rice grains. For this reason, the washing and separating action of microorganisms (mainly bacteria) adhering to the degermed and depressed portion of rice grains or the like is inferior. In addition, a large and wide installation area is required, the temporal amount of production is small, and it is not possible to obtain sufficient washing rice yield rate and rice-washing performance. As a result, it also leads to a problem that the rotting speed of rice after cooking is increased.

An object of the present invention is to enable anyone to easily carry out the rice-washing work, and to firmly wash wide variety of rice, irrespective of the quantity. That is, in the conventional device, it is not possible to respond to water absorption, permeation, swelling, weakening, collapse, and distaste, which makes it difficult to secure Japanese style rice quality in a white rice state. The present invention provides a rice polishing technique for regenerating this. Further, in a rice washer that can wash rice continuously in large quantities incorporated in a rice cooking line, a conveying device using the water flow is used when conveying the white rice to the next process after washing the rice, and sufficient rinsing is performed at the time of conveyance of the water flow. For this reason, it is possible to perform sufficient rinsing in a continuous treatment type rice washer in which the water flow is carried out in the rear-stage even if the cooking amount is small. In contrast, when washing rice with a small amount of cooked rice in a batch process, the rice grains are still wrapped with the water membrane of the high concentration wastewater ingredient that has been peeled off from the rice grain body even though rice-washing can be sufficiently performed. It is necessary to replace this water membrane with a clean water membrane. Therefore, the present invention provides a rice washer which can be installed in a space-saving manner which does not become an obstacle even when placed in a kitchen and can sufficiently perform rinsing even when washing rice in a small amount by batch processing.

Means for Solving the Problems

In order to solve the above problems, a rice washer according to one embodiment of the present invention includes a charging part into which milled rice is charged; a pressurized-stirring part provided at a rear-stage of the charging part and stirs and sequentially feeds the milled rice charged from the charging part under pressure; and a rinsing and stirring part which is provided at a rear-stage of the pressurized-stirring part and rinses the milled rice sent from the pressurized-stirring part while stirring.

According to such a configuration, by feeding the milled rice from the charging part to the pressurized-stirring part, the rice-polishing using pressurization to the milled rice, and rice-rinsing using stirring are performed. That is, the rice-polishing and the rice-rinsing are performed within a limited time by the pressurized-stirring part. Further, since rice-polishing and the rice-rinsing are carried out while sequentially charging the milled rice into the pressurized-stirring part, a desired amount of rice-washing can be continuously performed efficiently even in a space-saving manner. Furthermore, by feeding the milled rice to the rinsing and stirring part provided at the rear-stage of the pressurized-stirring part, it is possible to replace the water membrane of the high concentration wastewater ingredient wrapping the milled rice with a clean water membrane and to perform the sufficient rinsing.

In the above-mentioned rice washer, the pressurized-stirring part may have a cylinder; a shaft part which rotates in the cylinder; a spiral blade which rotates together with the shaft part in the cylinder and sequentially feeds the milled rice charged from the charging part; a projecting strip portion which rotates together with the shaft part in the cylinder and is provided at a rear-stage of the spiral blade; and a rinsing blade which rotates together with the shaft part in the cylinder and is provided at a rear-stage of the projecting strip portion. The rinsing and stirring part may have a Tomoe blade part which is provided in the cylinder, rotates together with the shaft part, and is provided at a rear-stage of the rinsing blade.

According to such a configuration, the milled rice in the cylinder is sequentially fed by the rotation of the spiral blade, while receiving a predetermined pressure by the pressure adjusting part. As a result, in the milled rice fed to the position of the projecting strip portion, a frictional separation effect between the rice grains occurs due to the rotation of the projecting strip portion. The milled rice fed to the position of the rinsing blade is subjected to rinsing separation and dilution by rotation of the rinsing blade. Furthermore, in the milled rice fed to the Tomoe blade part, the rinsing operation with a small resistance is performed by the rotation of the Tomoe blade part.

In the above-mentioned rice washer, a cross-sectional shape of the cylinder viewed in an axial direction at a position of the rinsing blade may be a polygonal tube type, and a cross-sectional shape of the cylinder viewed in the axial direction at a position of the Tomoe blade part may be cylindrical. Therefore, at the position of the rinsing blade, a great force due to the centrifugal force is applied to the rice grains between the polygonal cylinder inner wall and the rotating rinsing blade, and a strong rinsing action can be obtained. Further, at the position of the Tomoe blade part of the rear-stage thereof, the rice grains rotate with less resistance feeling between the cylindrical cylinder inner wall and the rotating Tomoe blade part, and a soft rinsing action can be obtained.

The rice washer may have a first water supply nozzle configured to supply water toward the spiral blade in the cylinder; a second water supply nozzle configured to supply water toward the projecting strip portion in the cylinder; a third water supply nozzle configured to supply water toward the rinsing blade in the cylinder; and a fourth water supply nozzle configured to supply water toward the Tomoe blade part in the cylinder.

According to such a configuration, the milled rice wetted by the water supplied from the first water supply nozzle is mixed and turbulently stirred together with the spiral blade. Further, the milled rice wetted by the water supplied from the second water supply nozzle is brought into contact with each rice grain under pressure with rotation of the projecting strip portion, and the starch layer bran is frictionally separated. In addition, the rice-rinsing is carried out with the rotation of the rinsing blade by the water supplied from the third water supply nozzle. Furthermore, rice-rinsing is carried out with the rotation of the Tomoe blade part by the water supplied from the fourth water supply nozzle, and the rice grains are wrapped in a clean water membrane.

The rice washer may further include a separation part which is provided at a rear-stage of the rinsing and stirring part to separate the milled rice and the water, and the separation part may include an inclined surface having a slit for separation to allow passage of water and prevent passage of the milled rice. According to such a configuration, the rice-polishing and rice-rinsing are performed by the pressurized-stirring part, and the milled rice further rinsed at the rinsing and stirring part is separated from water by the slit, and drops along the inclined surface. That is, the milled rice after the rice-washing from which unnecessary moisture has been removed drops along the inclined surface without passing through the slit, and is sent to a vessel such as a lower shuttle.

In the rice washer, the separation part may further have a flow plate provided outside the inclined surface, and the water that has passed through the slit may flow along the flow plate. As a result, the rinsed water that has passed through the slit on the inclined surface is efficiently discharged along the flow plate.

In the rice washer, a slit may be provided on a wall surface of the cylinder for separation to allow water in the cylinder to pass therethrough and prevent passage of the milled rice in the cylinder. As a result, water supplied into the cylinder when performing the rice-polishing and rice-rinsing is discharged from the slit to the outside of the cylinder. Meanwhile, the milled rice goes through the cylinder without passing through the slit.

The rice washer may further include a drain passage configured to receive and discharge the water separated from the milled rice. As a result, the water after the rinsing drops from the cylinder or the slit of the inclined surface and is discharged to the drain passage.

DETAILED DESCRIPTION OF THE EMBODIMENTS

Figure 1:
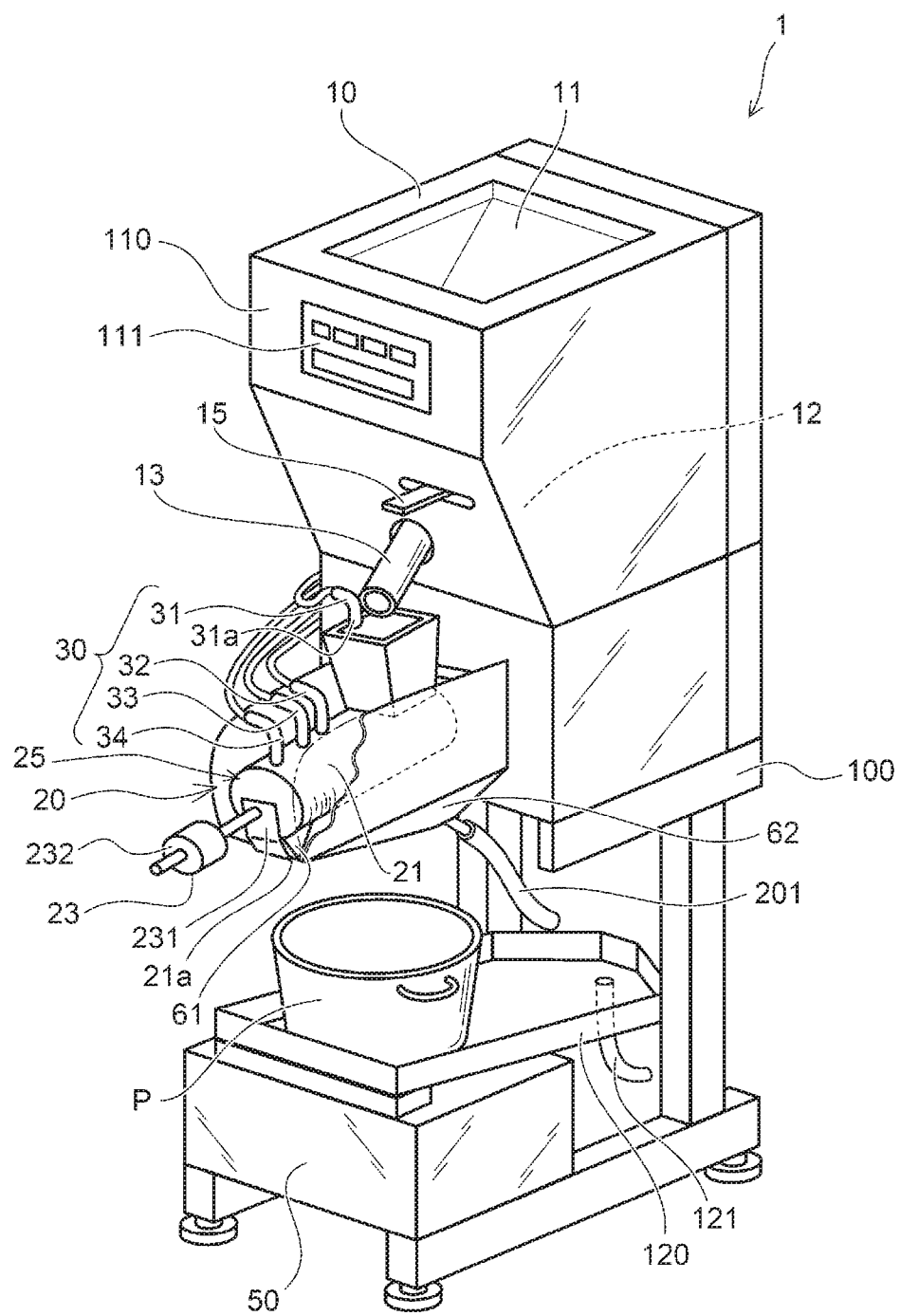
FIG. 1 is a perspective view illustrating a rice washer according to an embodiment.

Embodiments of the present invention will be described below with reference to the drawings. In the following description, the same members are denoted by the same reference numerals, and explanations of members once described are omitted as appropriate.

Overall Configuration of Device

FIG. 1 is a perspective view illustrating a rice washer according to an embodiment.

Figure 2:
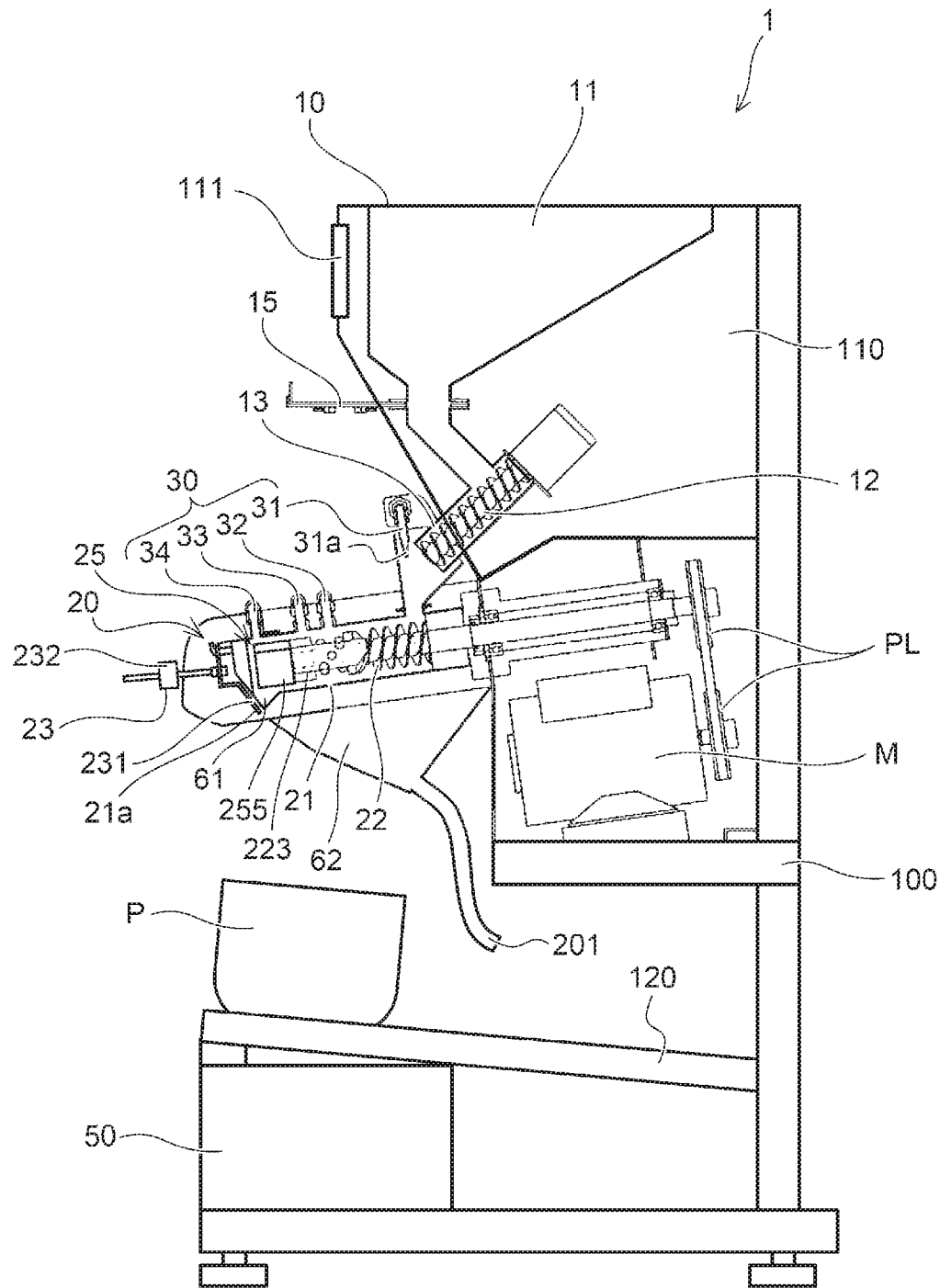
FIG. 2 is an internal configuration diagram illustrating the rice washer according to the embodiment.

FIG. 2 is an internal configuration diagram illustrating the rice washer according to the embodiment.

The rice washer 1 according to the present embodiment is a device that continuously conducts the rice-washing by charging the milled rice. The rice washer 1 includes a charging part 10, a pressurized-stirring part 20, and a rinsing and stirring part 25. The charging part 10 is disposed above a housing 100, and has a hopper 11 for charging the milled rice, and a feeding part 12 provided below the hopper 11. For example, spiral blades are used as the feeding part 12. The milled rice which is charged from the hopper 11 by the rotation of the spiral blade is sent to the pressurized-stirring part 20 of a rear-stage.

An opening/closing lever 15 is provided between the hopper 11 and the feeding part 12. By closing the opening/closing lever 15, the milled rice charged into the hopper 11 can be stored in the hopper 11 and the rice-washing process can be stopped. In order to proceed with the rice washing process, by opening the opening/closing lever 15, the milled rice inside the hopper 11 is sent to the feeding part 12. The spiral blade of the feeding part 12 is provided as a feeding part for stably cutting a certain rice amount in the unit of differentiation time. However, the case of only a certain stable condition from the viewpoint of quality and varieties of rice or the like may be omitted. Also, the entire feeding part 12 may be omitted. In this case, the amount of milled rice to be sent from the hopper 11 to the pressurized-stirring part 20 is adjusted by the opening amount of a shutter which is interlocked with opening/closing of the opening/closing lever 15.

An operation display part 111 may be provided on the front surface of a cover 110 which covers the outside of the charging part 10. The operation display part 111 is, for example, a touch panel display, and operation buttons (icons), processing conditions, and the like are displayed.

The pressurized-stirring part 20 is disposed at a middle stage (a rear-stage of the charging part 10) of the housing 100. The pressurized-stirring part 20 stirs the milled rice charged from the charging part 10, while pressurizing the milled rice, and sequentially feeds the milled rice. By pressurizing and stirring using the pressurized-stirring part 20, rice-polishing and rice-rinsing are performed on the milled rice. The pressurized-stirring part 20 successively performs the rice-polishing and the rice-rinsing, while feeding the milled rice. Details of the pressurized-stirring part 20 will be described later.

The rinsing and stirring part 25 is provided at the rear-stage of the pressurized-stirring part 20 and has a function of rinsing the milled rice sent from the pressurized-stirring part 20, while stirring the milled rice. In the present embodiment, the rinsing and stirring part 25 is provided in a cylinder 21 of the pressurized-stirring part 20. Details of the rinsing and stirring part 25 will be described later.

The rice washer 1 is provided with a water supply part 30 for supplying water to the pressurized-stirring part 20. By supplying water from the water supply part 30 to the pressurized-stirring part 20, water necessary for the rice-polishing and the rice-rinsing performed in the pressurized-stirring part 20 is provided, and water necessary for the rice-rinsing performed in the rinsing and stirring part 25 is provided. In the present embodiment, the water supply part 30 includes a first water supply nozzle 31, a second water supply nozzle 32, a third water supply nozzle 33, and a fourth water supply nozzle 34.

The first water supply nozzle 31 supplies water to the front-stage part (a feed part of the milled rice) of the pressurized-stirring part 20. In the configuration in which the spiral blade of the feeding part 12 or the entire feeding part 12 is omitted, water may be supplied to the vicinity of the base of the cylinder 21 provided in the pressurized-stirring part 20. The second water supply nozzle 32 supplies water to the middle-stage part (a polished part of the milled rice) of the pressurized-stirring part 20. The third water supply nozzle 33 supplies water to a rear-stage part (a rinsed part of the milled rice) of the pressurized-stirring part 20.

The fourth water supply nozzle 34 supplies water to the rinsing and stirring part 25 provided in the vicinity of the outlet of the cylinder 21. As a result, water necessary for rinsing the milled rice with the rinsing and stirring part 25 is supplied, and smoothly softened rice grains can be washed out.

A placing part 50 for placing a pot P or the like for receiving the milled rice which is discharged from the opening 21a of the cylinder 21 via the pressurized-stirring part 20 and the rinsing and stirring part 25 is provided at the lower stage of the housing 100. An inclined tray 120 is provided on the placing part 50. By placing the pot P on the lower part of the outlet side of the pressurized-stirring part 20 and on the front side of the tray 120, the milled rice coming out of the cylinder 21 is received by the pot P. Further, since the tray 120 is inclined so as to be lowered rearward, water discharged from the cylinder 21 or water overflowing from the pot P is allowed to flow toward the rearward of the housing 100 and can be discharged from a hose 121.

Structure of Pressurized-Stirring Part and Rinsing and Stirring Part

Figure 3:
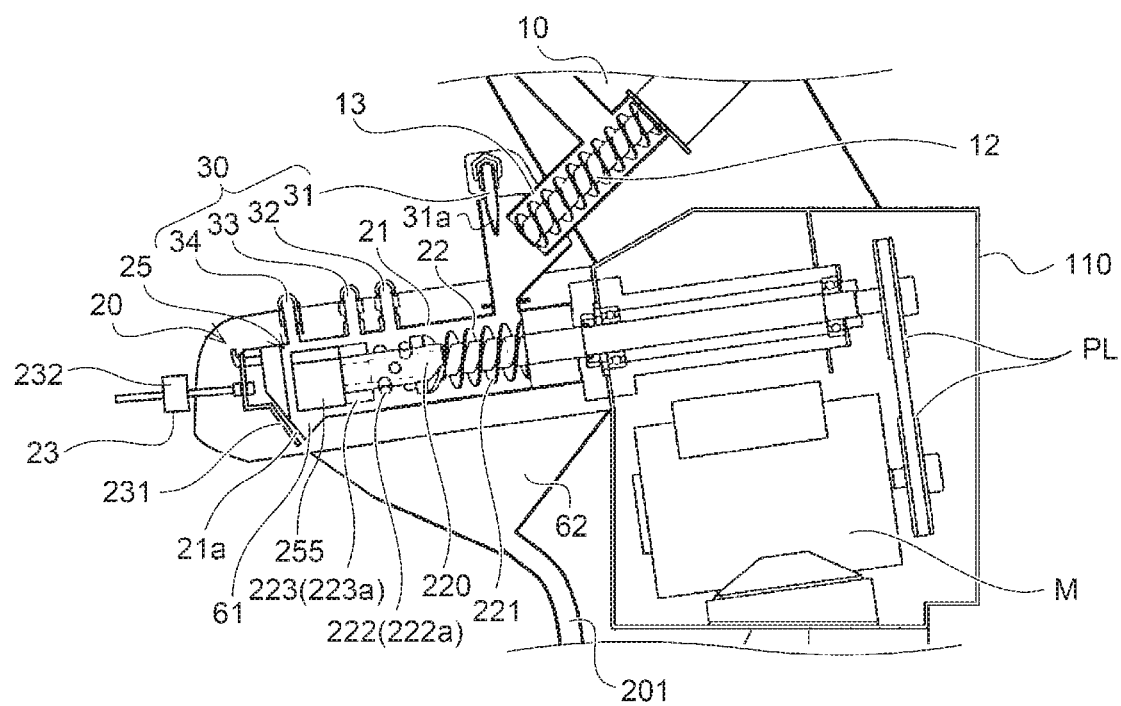
FIG. 3 is an internal configuration diagram illustrating the configurations of a pressurized-stirring part and a rinsing and stirring part.

FIG. 3 is an internal configuration diagram illustrating the configurations of the pressurized-stirring part and the rinsing and stirring part.

Figure 4:
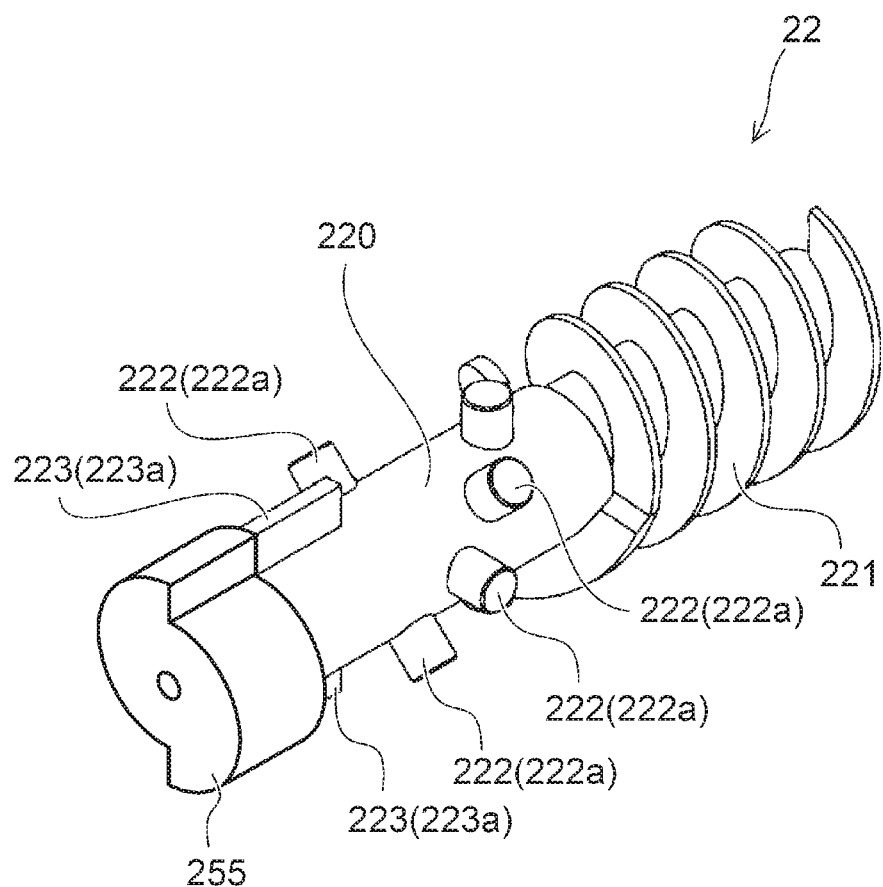
FIG. 4 is a perspective view illustrating a pressurized-stirring screw.

FIG. 4 is a perspective view illustrating a pressurized-stirring screw.

The pressurized-stirring part 20 includes a cylinder 21, a pressurized-stirring screw 22 provided in the cylinder 21, and a pressure adjusting part 23. The cylinder 21 is provided to protrude slightly downward toward the front from the cover 110 on the lower side of the charging part 10.

The pressurized-stirring screw 22 is provided in the cylinder 21 and rotates about the shaft. A motor M for rotationally driving the pressurized-stirring screw 22 is provided in the cover 110. The rotation of the motor M is transmitted to the pressurized-stirring screw 22 via a pulley PL.

The pressure adjusting part 23 is provided in front of the cylinder 21. The pressure adjusting part 23 includes a lid 231 which closes the opening 21a provided on a projecting end side of the cylinder 21, and a weight 232 for adjusting the pressure. The position of the weight 232 is adjustable, and the pressure for closing the lid 231 is adjusted by the position of the weight 232.

The pressurized-stirring screw 22 has a shaft part 220 rotating in the cylinder 21, a spiral blade 221 rotating together with the shaft part 220, and a projecting strip portion 222 and a rinsing blade 223. The spiral blade 221 is provided on the front-stage side (a side close to the charging part 10) of the shaft part 220. The spiral blade 221 serves to sequentially feed the milled rice charged from the charging part 10 along the rotating spiral blade 221 to the rear-stage. When delivered to the rear-stage along the spiral blade 221, the milled rice comes into contact with the water supplied from the first water supply nozzle 31 of the water supply part 30, and is sent, while being stirred in a state in which the water and the rice grain are mixed and turbulent in the space.

The projecting strip portion 222 is provided on the rear-stage side of the spiral blade 221. The projecting strip portion 222 has a plurality of protruding portions 222a. The plurality of protruding portions 222a is disposed so as to draw a spiral around the shaft part 220 at predetermined intervals. In the projecting strip portion 222, a frictional separation effect between rice grains is generated with respect to the sequentially fed milled rice. A moderate amount of water is supplied from the second water supply nozzle 32 of the water supply part 30 to the projecting strip portion 222. Water-wetted milled rice is stirred in the cylinder 21 by the rotation of the plurality of protruding portions 222a, and rice grains collide with each other. By the collision, a frictional separation effect between the rice grains occurs and the rice-polishing can be carried out.

As a result, since the plurality of protruding portions 222a is disposed so as to draw a spiral around the shaft part 220, it is possible to apply a frictional separation effect to the milled rice which is sent by the spiral blade 221 all the time. Various shapes of the protruding portion 222a may be selected from a cylindrical shape, a prismatic shape, an elliptical cylindrical shape, and the like. However, if the shape has a curved surface such as a cylindrical shape or an elliptical cylindrical shape, the milled rice which comes into contact with the protruding portion 222a is stirred to roll, the rice-polishing can be performed by the frictional separation effect caused by the contact between the rice grains or with the projecting strip portion 222 and the outer wall pipe portion inside the cylinder 21.

The rinsing blade 223 is provided on the rear-stage side of the projecting strip portion 222. The rinsing blade 223 has a plurality of plate blades 223a. In the present embodiment, the two plate blades 223a are provided at positions different from each other by 180 degrees around the shaft part 220. An appropriate amount of water is supplied from the third water supply nozzle 33 of the water supply part 30 to the rinsing blade 223. As a result, the milled rice is stirred by the rotation of the rinsing blade 223. Thus, the rice-rinsing is performed.

The rinsing and stirring part 25 is provided at the rear-stage of such a pressurized-stirring part 20. The rinsing and stirring part 25 has a Tomoe blade part 255. The Tomoe blade part 255 has a configuration in which two semi-circular blades are arranged with their centers shifted from each other. The Tomoe blade part 255 is provided at the rear-stage of the rinsing blade 223 (a tip side of the shaft part 220), and is configured to rotate within the cylinder 21 together with the rotation of the shaft part 220. The rotation of the Tomoe blade part 255 causes the rice-rinsing with less resistance.

The lid 231 of the pressure adjusting part 23 is configured to close the opening of the cylinder 21 by the weight of the weight 232. Meanwhile, milled rice is sequentially fed into the cylinder 21 by the rotation of the pressurized-stirring screw 22. As a result, the milled rice receives a predetermined pressure in the cylinder 21, and a frictional separation effect between the rice grains occurs. Then, when the pressure from the milled rice in the cylinder 21 to the lid 231 becomes larger than the pressure for closing the lid 231 by the weight 232, the lid 231 opens and the milled rice is discharged from the opening 21a of the cylinder 21.

Water is supplied into the cylinder 21 from the first water supply nozzle 31, the second water supply nozzle 32, the third water supply nozzle 33, and the fourth water supply nozzle 34 of the water supply part 30 described above. The first water supply nozzle 31 supplies water toward the spiral blade 221. The second water supply nozzle 32 supplies water toward the projecting strip portion 222. The third water supply nozzle 33 supplies water toward the rinsing blade 223. The fourth water supply nozzle 34 supplies water to the Tomoe blade part 255.

It is preferable that the discharge port 31a of the first water supply nozzle 31 be provided slightly above the feeding part 12 of the charging part 10. As a result, the milled rice coming out of the feeding part 12 comes into contact with the water supplied from the first water supply nozzle 31 in the passage until the milled rice is sent to the pressurized-stirring part 20, and is smoothly fed into the cylinder 21 with the force of water.

Figure 5A:
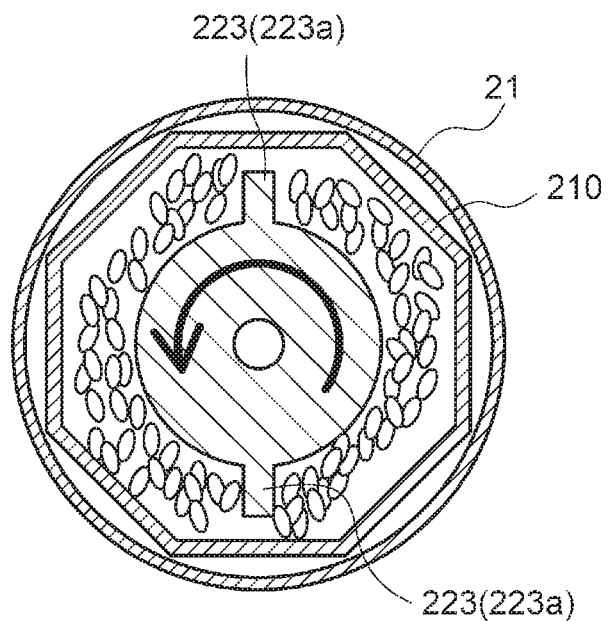
FIGS. 5A and 5B are schematic views illustrating a cross section of a cylinder as viewed from an axial direction.
Figure 5B:
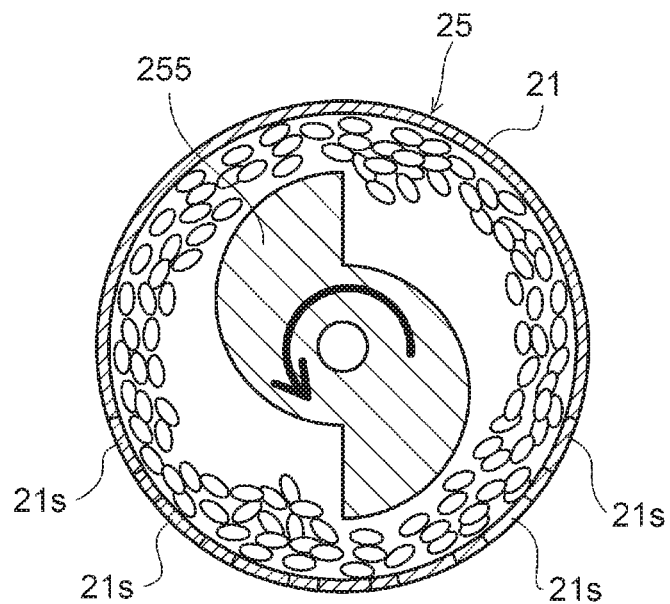

FIGS. 5A and 5B are schematic views illustrating a cross section of the cylinder as viewed from an axial direction.

FIG. 5A illustrates a cross-sectional view at a position of the rinsing blade 223, and FIG. 5B illustrates a cross-sectional view at a position of the Tomoe blade part 255.

As illustrated in FIG. 5A, the milled rice in the cylinder 21 is stirred at the position of the rinsing blade 223 by the rotation of the rinsing blade 223. At this time, a large centrifugal force is applied to the rice grains which are stirred in the cylinder 21 with the rotation of the rinsing blade 223, and spin is applied. At the position of the rinsing blade 223, the cylinder 21 may have a polygonal tubular wall portion 210. As the rinsing blade 223 rotates in the polygonal tubular wall portion 210, a gap between the tip of the rinsing blade 223 and the wall surface of the polygonal tubular wall portion 210 repeatedly widens and narrows rapidly. As a result, aggregation and dispersion of the rice grains are repeated, a large centrifugal force acts on the rice grains, and a strong frictional separation effect occurs between the rice grains.

In addition, the Tomoe blade part 255 as illustrated in FIG. 5B is provided at the rear-stage of the rinsing blade 223 in the cylinder 21. At the position of the Tomoe blade part 255, the cylinder 21 has a cylindrical cross-sectional shape. Accordingly, as the Tomoe blade part 255 rotates, the gap between the tip of the Tomoe blade part 255 and the inner wall of the cylinder 21 repeatedly widens and narrows smoothly. As a result, large centrifugal force does not work on the rice grain, and intense spin does not occur. Therefore, the rice grain is rotated with less resistance feeling by the rotation of the Tomoe blade part 255, and a smooth rinsing action can be obtained. Water used for rice-polishing or rice-rinsing is discharged from a drain slit 21s provided in the cylinder 21. Since the clean water is supplied into the cylinder 21 from the fourth water supply nozzle 34, the water membrane of the high concentration wastewater ingredient adhering to the rice grain by the rinsing and stirring part 25 is replaced with a clean water membrane.

Figure 6:
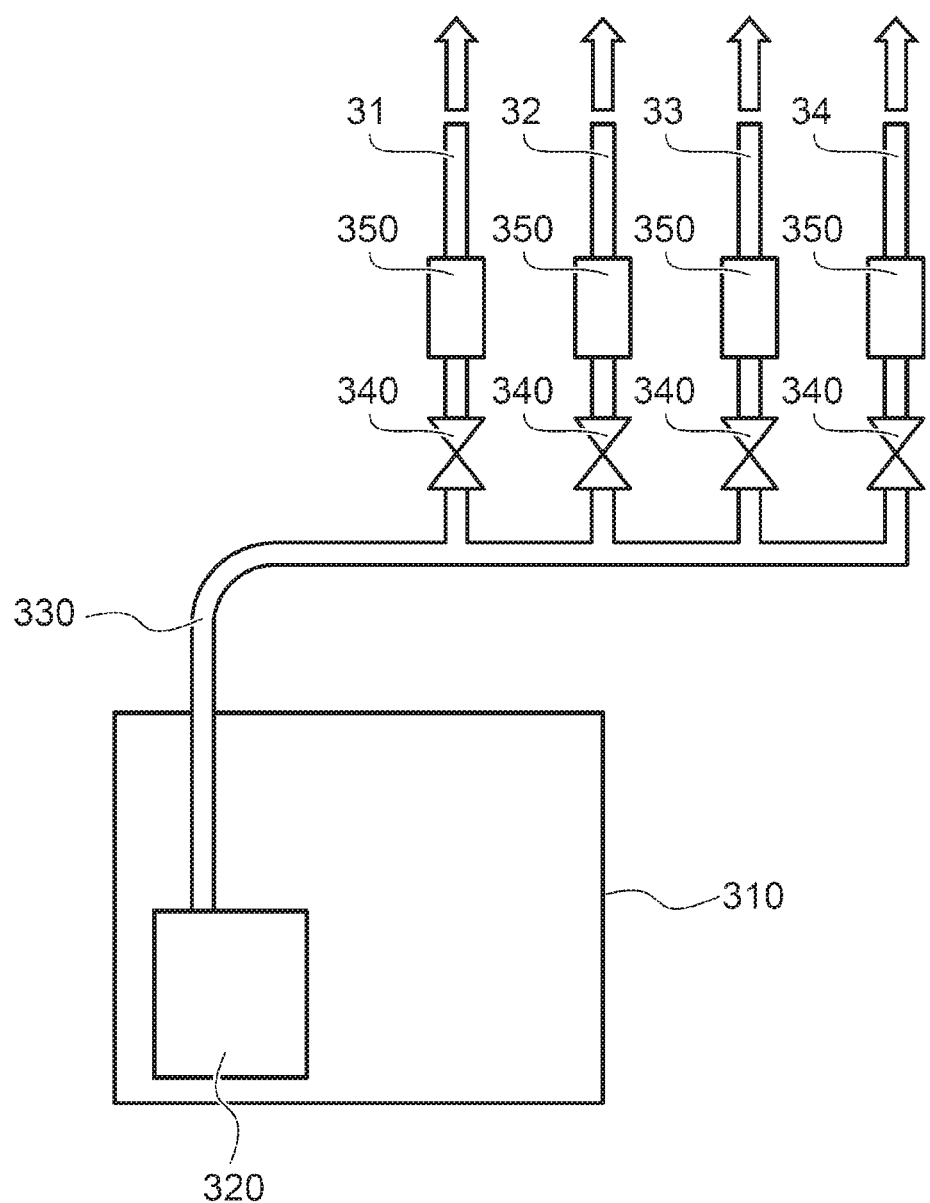
FIG. 6 is a system diagram of the water supply nozzle.

FIG. 6 is a system diagram of the water supply nozzle.

In FIG. 6, a system diagram of the first water supply nozzle 31 to the fourth water supply nozzle 34 is exemplified. A pump 320 is built in the water storage tank 310. The water sent from the water storage tank 310 to a pipe 330 by the pump 320 is sent to the first water supply nozzle 31, the second water supply nozzle 32, the third water supply nozzle 33, and the fourth water supply nozzle 34 via the branch of the pipe 330.

A valve 340 and a water flow meter 350 are provided in each pipe 330 of the first water supply nozzle 31, the second water supply nozzle 32, the third water supply nozzle 33, and the fourth water supply nozzle 34. A degree of opening of the valve 340 may be controlled by a controller (not illustrated), on the basis of the measured value of the water flow meter 350.

The amount of water supplied from each of the first water supply nozzle 31, the second water supply nozzle 32, the third water supply nozzle 33, and the fourth water supply nozzle 34 may be controlled independently. As a result, water of the optimal flow rate for rice-polishing and rice-rinsing is supplied from the first water supply nozzle 31, the second water supply nozzle 32, the third water supply nozzle 33, and the fourth water supply nozzle 34. The degree of opening of the valves connected to each of the first water supply nozzle 31, the second water supply nozzle 32, the third water supply nozzle 33, and the fourth water supply nozzle 34 is manually set, and the flow rate information read by the water flow meter 350 may be sent to the controller and an alarm may be issued when the flow rate deviates from the set flow rate.

The water storage tank 310 may also serve as the placing part 50. Further, the water storage tank 310 may be housed inside the placing part 50. As a result, space-saving of the device can be achieved. In the example illustrated in FIG. 6, the water stored in the water storage tank 310 is sent to the pipe 330 by the pump 320, but water may be directly sent from the water pipe to the pipe 330, without providing the water storage tank 310 and the pump 320. In a case where the water pressure of the water pipe is insufficient, a pressure-increasing pump for increasing the water pressure may be provided between the water pipe and the pipe 330 to obtain a water pressure capable of corresponding to the water supply. Here, it is important to keep the tap water pressure constant in order to ensure the rice washing performance quality of this device. This is because the frictional separation effect provided by the pressurized stirring described above is a device which requires a stable ratio in differential time unit as a ratio between the amount of water to be added and the amount of rice grain to be cut out and fed. If water is used for separate water in the same pipe, there is a case where the water pressure decreases immediately, the sequential high pressure is applied to the rice grains to crush the rice grains, the pressurized-stirring screw 22 is locked and the machine main body is broken. Therefore, it is important to secure stability of the water pressure.

Figure 7:
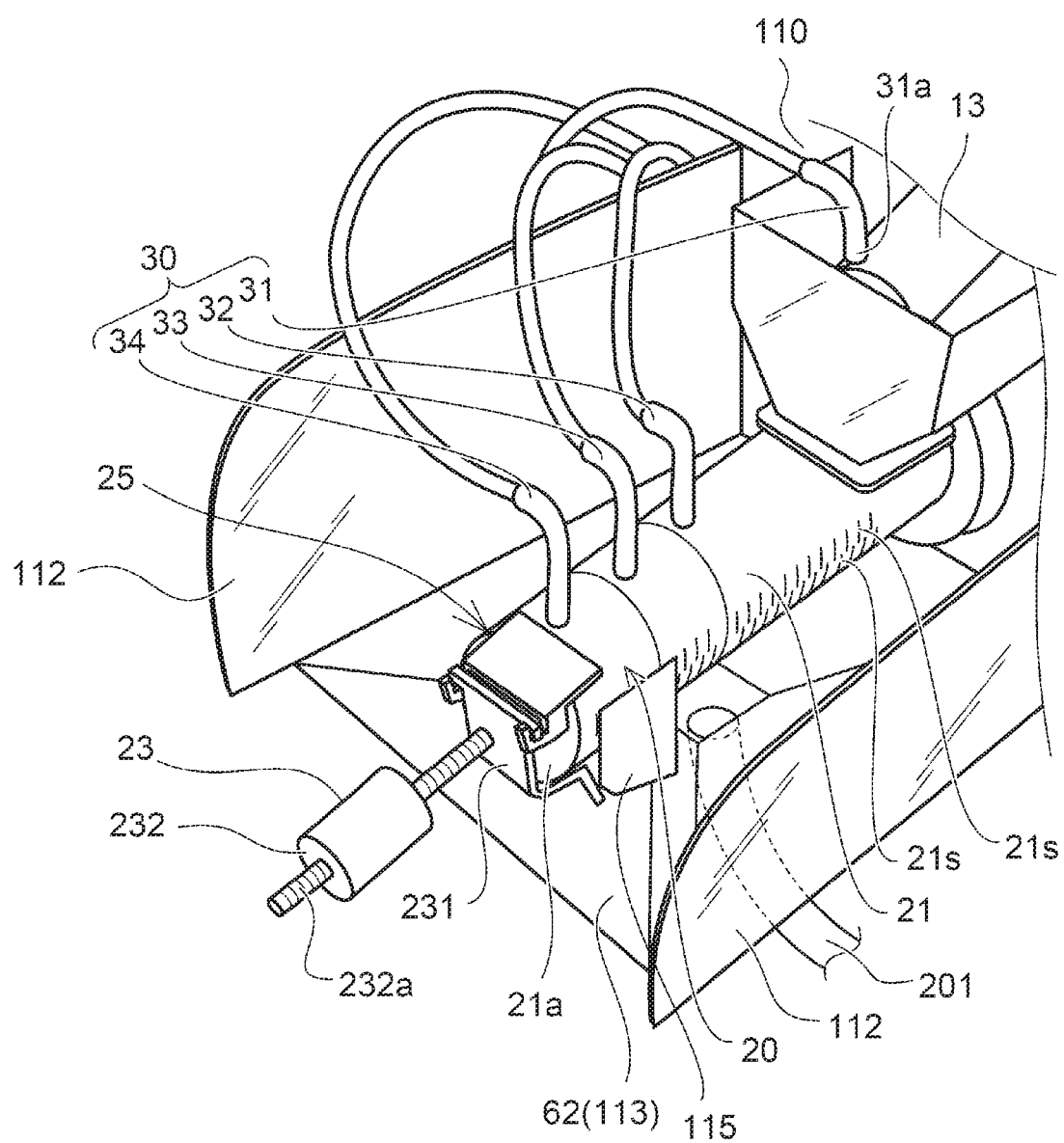
FIG. 7 is a perspective view illustrating a cylinder periphery.

FIG. 7 is a perspective view illustrating the cylinder periphery.

A side cover 112 is provided on the left and right sides of the cylinder 21 protruding from the cover 110. Further, a drain cover 113 extending from the side cover 112 is provided below the cylinder 21. The drain cover 113 is a part of the drain passage 62. A hose 201 is connected to the drain passage 62, and the water dropping downward from the cylinder 21 can be received by the drain cover 113 and discharged to the outside from the hose 201.

A drain slit 21s is provided on the lower side (bottom side) of the cylinder 21. The drain slit 21s is a hole provided in an elongated shape along the circumference of the cylinder 21. The drain slit 21s is provided in such a size that the milled rice does not escape. Water, which is sent from the first water supply nozzle 31, the second water supply nozzle 32, the third water supply nozzle 33, and the fourth water supply nozzle 34 into the cylinder 21 and is used for the rice-polishing or the rice-rinsing, is discharged from the drain slit 21s. The water discharged from the drain slit 21s is received by the drain cover 113 of the drain passage 62 and discharged to the outside from the hose 201.

Figure 8:
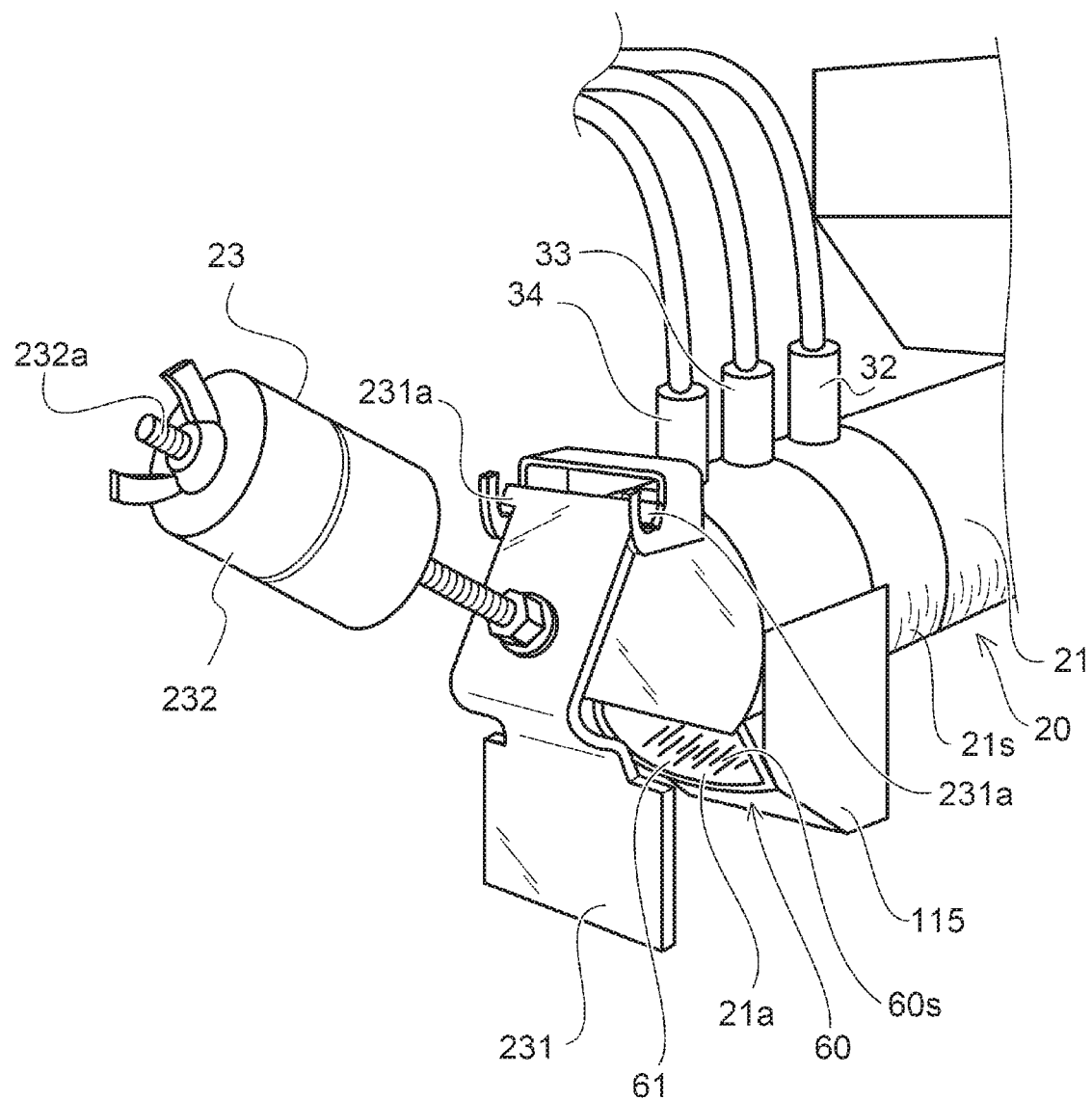
FIG. 8 is a perspective view illustrating the vicinity of a cylinder outlet.

FIG. 8 is a perspective view illustrating the vicinity of a cylinder outlet.

FIG. 8 illustrates a state in which the lid 231 is opened. The lid 231 of the pressure adjusting part 23 is provided so as to be openable and closable about a fulcrum 231a. A bolt 232a is provided to protrude from the lid 231, and the weight 232 is attached to the bolt 232a. A female screw is provided on the weight 232 and is screwed with the bolt 232a. By changing the position of the weight 232 with respect to the bolt 232a, the pressure applied to the lid 231 can be adjusted. That is, as the weight 232 approaches the lid 231, a distance between the fulcrum 231a and the weight 232 becomes closer, and the pressure for closing the lid 231 decreases. Conversely, as the weight 232 is separated from the lid 231, the distance between the fulcrum 231a and the weight 232 increases, and the pressure for closing the lid 231 increases.

By adjusting the pressure by the pressure adjusting part 23, the strength of the frictional separation effect between rice grains in the cylinder 21 can be adjusted. For example, the strength of the frictional separation effect can be adjusted by the pressure adjusting part 23, depending on the type of rice (Japonica rice and Indica rice), the change in storage condition, and the quality requirement of the rice to be used.

Further, the weight 232 of the pressure adjusting part 23 may have a configuration in which the distance of the weight from the fulcrum 231a is changed, such as a configuration in which a movable weight capable of being adjusted in position between the pair of support plates is provided, in addition to a structure in which the weight 232 is attached to the bolt 232a as described above.

The rice washer 1 may have a separation part 60. The separation part 60 is provided below the rinsing and stirring part 25, and serves to separate the milled rice coming out of the rinsing and stirring part 25 and water. The separation part 60 includes an inclined surface 61 having a slit 60s. A drain passage 62 is disposed below the cylinder 21 and the inclined surface 61.

When the milled rice mixed with water comes out of the rinsing and stirring part 25, the water passes through the slit 60s of the inclined surface 61 and is discharged from the drain passage 62 to the outside via the hose. Meanwhile, the milled rice falls along the surface of the inclined surface 61 without passing through the slit 60s, and is housed in a pot P disposed in a lower part.

The separation part 60 may further have a flow plate 115 provided outside the inclined surface 61. The flow plate 115 is disposed so as to cover both sides and the lower part of the inclined surface 61. As a result, the water that has passed through the slit 60s is guided along the flow plate 115 to the drain passage 62. The separation part 60 separates the rinse water and the milled rice and can efficiently deliver the milled rice from which excessive moisture has been removed to the pot P.

Rice Washing Operation

Next, the rice washing operation using the rice washer 1 will be described.

Figure 9:
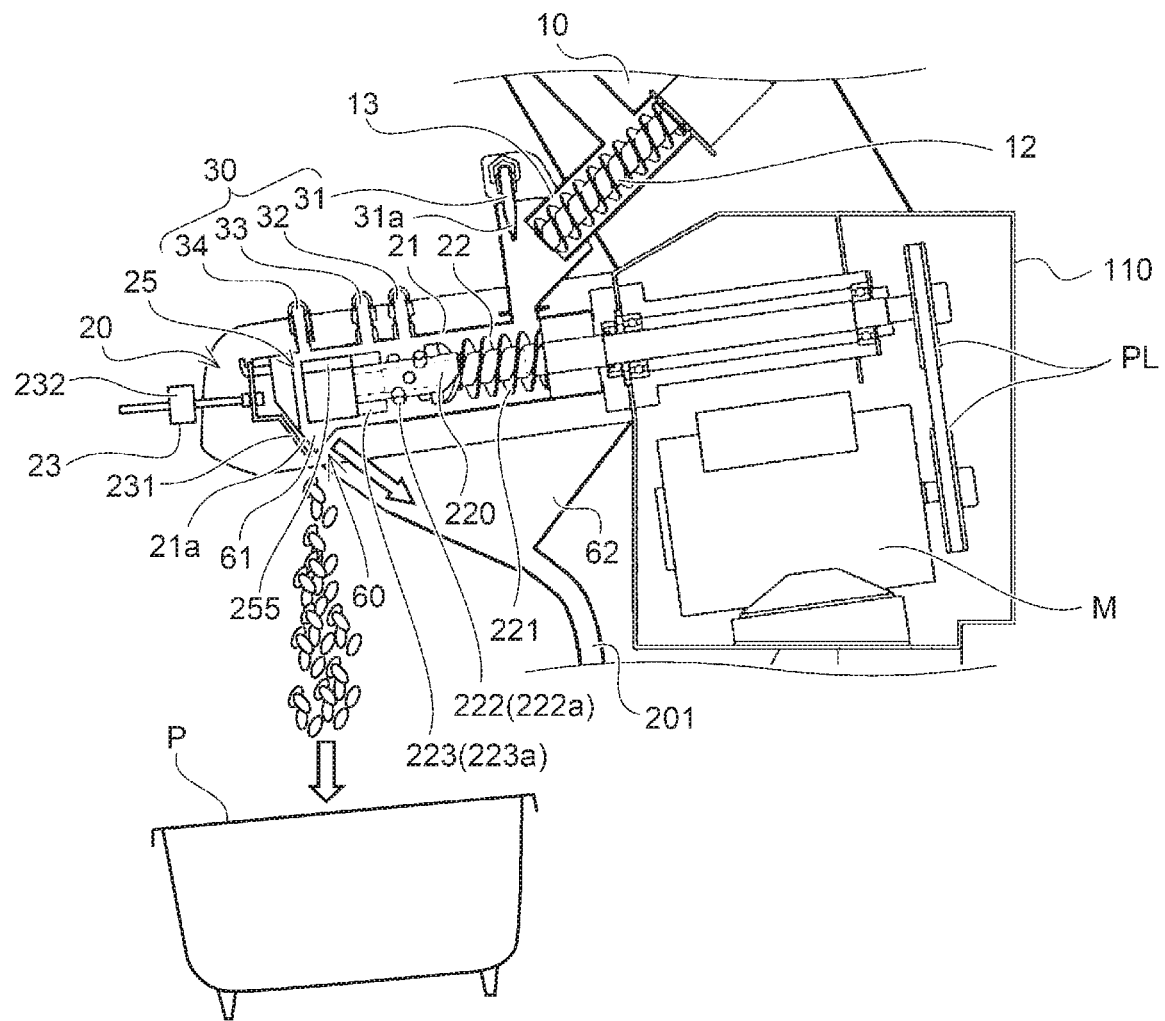
FIG. 9 is a schematic view illustrating a rice washing operation.

FIG. 9 is a schematic view illustrating a rice washing operation.

In the following description, other figures are referred to for the configuration not illustrated in FIG. 9 as appropriate.

First, milled rice for washing rice is charged from the hopper 11 of the charging part 10. At this time, by keeping the opening/closing lever 15 closed, it is possible to store the required amount of milled rice in the hopper 11. Next, the operation display part 111 is operated to instruct the start of the rice washing operation. At this time, the mode selection of the rice washing operation (the rotational speed of the feeding part 12, the rotational speed of the pressurized-stirring screw 22, the supply amount of water from the water supply part 30, the control sequencer, etc.) can be performed, depending on the type and amount of rice, the state of rice, and the like. Further, the opening/closing lever 15 is opened.

As a result, milled rice is sequentially sent from the hopper 11 to the pressurized-stirring part 20. The milled rice sent to the pressurized-stirring part 20 is fed into the cylinder 21 by the rotation of the pressurized-stirring screw 22. Water is supplied into the cylinder 21 from the water supply part 30. Further, the milled rice progresses in the cylinder 21, is stirred by the projecting strip portion 222 of the pressurized-stirring screw 22 under pressure, and is milled by the frictional separation effect between the rice grains. The rice grains centrifugally discharged by the projecting strip portion 222 turbulently flow in the cylinder 21, but are collected by the projecting strip portion 222 and are repeatedly discharged again. At this time, there may be a great difference in the centrifugal discharge force received by the rice grain on the projecting strip portion 222 side of the collected rice grain and the rice grain on the outside, and thus, a turbulent flow of displacement effect occurs between the rice grains. As a result, the rice-washing frictional separation effect occurs.

Further, the milled rice which has advanced by the pressurized-stirring screw 22 is stirred and rinsed by the rotation of the rinsing blade 223. Further, the milled rice which has advanced in the cylinder 21 is rinsed, while being stirred by the rotation of the Tomoe blade part 255 of the rinsing and stirring part 25. Thereafter, the lid 231 of the pressure adjusting part 23 is opened by the feed pressure of the milled rice, and the milled rice is discharged from the opening 21a of the cylinder 21. In a case where the separation part 60 is provided, the milled rice and water are efficiently separated by the separation part 60, and the milled rice in which the polishing and rinsing are completed is stored in the pot P.

In the rice washer 1 of this embodiment, the milled rice charged into the hopper 11 can be continuously washed by the rotation of the pressurized-stirring screw 22. Therefore, there is no need for a large space for storing the milled rice by the rice-washing process, and the size of the entire device can be reduced.

Further, since the polishing and rinsing are carried out, while advancing the milled rice in the cylinder 21 by the rotation of the pressurized-stirring screw 22, the starch layer bran can be reliably removed from the rice grains in a short time. Specifically, in the rice washer 1 of the present embodiment, in a state in which the milled rice is charged into the hopper 11, there is a time of about 5 seconds to 10 seconds until the milled rice is sent to the pressurized-stirring part 20 and is discharged from the opening 21a. The short time is the most important, and in this embodiment, any large amount of rice is all polished and rinsed after the rice grains encounter water within ten seconds.

In the rice washer 1 of this embodiment, the rice-washing can be performed at such a speed. Therefore, for a milled rice of about 5 kg to 7 kg, for example, rice which has been disassembled is charged into the hopper 11, a pot P is set on the placing part 50, and when the operation display part 111 is operated to start the rice-washing operation, after several tens of seconds (about 30 seconds), the milled rice which is washed will be stored in the pot P. By providing a sensor (not illustrated) in the hopper 11, it may be possible to detect that there is no milled rice in the hopper 11 and automatically stop the rice washer 1. As described above, the rice washer 1 of the present embodiment is also advantageous for washing rice in a unit of a pot.

Also, when there is a need for a compact device that can be used in a small kitchen, or when the rice-washing with a small amount of rice cooked is performed, there are many cases where the rice after washing is directly received by the pot or is received by a kettle and put in a pot, and water addition and subtraction is adjusted to cook. In this case, a sufficient rinsing performance cannot be obtained, and a porridge curtain may be formed by attached starch on the bottom of the pot of a large-scale cooker (for example, 10 kg or more).

In addition, even if the rice-washing is carried out, the rice grains are in a state of being wrapped in a water membrane of high concentration wastewater ingredients peeled off from the rice grain body. For rice washing, it is necessary to replace this water membrane with a clean water membrane. Such washed rice is a rice-washing function called rinsing washing or rinsing.

However, since water on the surface of the rice grains adheres to the surface of the rice grains by surface tension, an exchange of water membranes is inefficient with a simple operation performance. To do the exchange, a lot of time, a large area (rice washing area), and a large amount of rinsing water are needed.

For example, the rising is a case where the laundry such as everyday clothes needs a lot of water and that it takes a lot of time for the rinsing. Centrifugal separation capability is provided for a device that performs none rice-washing and general washing machines. If the centrifugal separation capability exists, there is no consciousness of inconvenience in separation of rinsing water and exchanging the new fresh water.

The rice washer 1 according to the present embodiment can secure a rice rinsing and washing function capable of easily replacing the water membrane with a clean water membrane, without passing through such a centrifugal separation function.

Penetration of Water in Rice-Washing

When the milled rice comes in contact with water, water begins to permeate into the endosperm starch layer from the moment of contact. The rate of penetration is about 1 to 2 μm per second. When the water penetration begins, swelling between the starch particles begins, and a phenomenon in which the starch particles are peeled off from the rice grain body in units of aggregates of starch granules (aggregates of several units of block unit starch particles) occurs. For example, with an aggregate size of 2 μm×15 μm, a starch aggregate (a small block of rice starch) will peel off from the rice grains about 30 seconds after touching the water. In other words, as long as such peeling of the starch aggregate occurs, a strong frictional separation effect may be applied between the rice grains.

On the other hand, when the milled rice touches the water, wet-softening of the rice grain surface starts from the moment of touching. It is not preferable for the rice-polishing to pressurize and rub against the rice grains that have been wet-softened for a long time. Therefore, no matter how much rice, rice is polished within a few seconds, and after the rice-rinsing within several tens of seconds, power is not applied to rice grains as much as possible.

From such findings, the inventors of the present invention have conducted the rice-polishing by generating a frictional separation effect between the rice grains within the time after touching of the milled rice with water to the peeling of the starch aggregate, and by promptly performing from the rice-rinsing to separation and dilution, the configuration of the rice washer 1 which can reliably remove the starch layer bran from the rice grain without causing peeling of starch aggregate has been reached.

According to the configuration of the rice washer 1 of this embodiment, it is possible to achieve the time for washing rice per grain in the pressurized-stirring part 20 within 5 seconds (at most within 10 seconds), and the rice-washing operation can be completed simply by passing through the pressurized-stirring part 20 only once so as not to move rice grains of immersion time exceeding 30 seconds in principle. That is, the milled rice once washed is not washed again by circulating in the rice washer 1.

Therefore, in the rice washer 1, it is possible to obtain a very high washing rice yield rate (about 99% to 99.3%). Here, the washing rice yield rate (%)=(washed rice mass/original milled rice mass)×100. However, since it is difficult to actually measure the washed rice mass, the washed rice mass is obtained using a biochemical oxygen demand (BOD) value.

The calculation formula for obtaining the washed rice mass from the BOD value is as follows. In the following formula, the unit of washed rice mass, the original milled rice mass, and total rice-washing water amount is kg.

Washed rice mass=original milled rice mass−(total rice-washing water amount×rice-washing drainage BOD value÷0.85)

In the above formula, the reason for dividing the BOD value by 0.85 is as follows. That is, the ingredient mass calculated from the BOD value is an absolute mass, which is a mass not containing 15% of moisture originally possessed by milled rice. Therefore, in order to correct 15%, the BOD value is divided by 0.85.

Therefore, the calculation formula for obtaining the washing rice yield rate from the BOD value is as follows.

Washing rice yield rate (%)=((original milled rice mass−(total rice-washing water amount×rice-washing drainage BOD value÷0.85)/original milled rice mass))×100

A specific example of the calculation of the washing rice yield rate in the rice washer 1 is as follows.

Conditions for rice-washing are 100 kg of milled rice, 150 kg of total rice-washing water amount, and 3500 ppm of rice-washing drainage BOD value. The BOD value of 10000 ppm is 1%.

When calculating the washing rice yield rate based on this conditions for rice-washing, ((100 kg−(150 kg×0.0035÷0.85)/100 kg))×100=99.38%.

Further, since the rice washer 1 can efficiently and continuously process in a short time as described above, it has processing capability of performing about 600 kg of rice-washing per hour.

Moreover, the installation area of the rice washer 1 can be reduced to about 1 m². With such an installation area, it does not get in the way even if it is put in a narrow space like a kitchen of a store or a hotel. In addition, if milled rice to be washed is charged into the charging part 10 and the washing operation is started, operation from rice-washing to stoppage can be automatically carried out, and a desired amount of rice-washing can be performed without a complicated operation.

In particular, Japanese rice varieties available outside Japan are dominated by single bags (5 kg or 10 kg) distributed in milled rice different from Japan, and are milled rice stored nearly 200 days at ambient temperature after milling.

In order to wash rice like this, the rice washer 1 of this embodiment considering the time characteristic of rice-polishing and rice-rinsing as described above is very suitable.

According to the rice washer 1 of the present embodiment, it is possible to cook delicious rice without requiring operator's rule of thumb or washing rice technique at all, and it is possible to carry out rice-washing that can provide rice with so-called long legs (small number of bacteria, long time to degeneration).

As described above, according to the rice washer 1 of the embodiment, it is possible for anyone to easily perform the rice-washing operation, it is possible to wash rice firmly irrespective of the quantity of various kinds of rice, and it is possible to install it in a space-saving degree that does not become an obstacle even when placed in a kitchen.

Although the present embodiment and specific examples thereof have been described above, the present invention is not limited to these examples. For example, in the above description, the example in which the milled rice after rice-washing is stored in the pot P is described, but the rice washer 1 can also be applied to the rice cooking line. In this case, the rice washer 1 may be disposed so that the cylinder 21 and the separation part 60 are disposed on the conveying part (conveying line) before rice cooking in the rice cooking line. Further, in the above embodiment, although a case where rice is washed as grain has been described as an example, it can be used as a grain scrubbing device for washing other grains such as sesame, wheat (raw material of barley tea), and coffee beans by changing slit width etc. of screws and cylinders. Further, those skilled in the art may appropriately add, delete, or change the design of the constituent elements, or appropriately combine the features of the respective embodiments with respect to each of the above-described embodiments, with the gist of the present invention, as long as they are included in the scope of the present invention.

What is claimed is:

1. A rice washer, comprising:
   a charging part into which milled rice is charged;
   a pressurized-stirring part which is provided at a rear-stage of the charging part and stirs and sequentially feeds the milled rice charged from the charging part under pressure; and
   a rinsing and stirring part which is provided at a rear-stage of the pressurized-stirring part and rinses the milled rice sent from the pressurized-stirring part while stirring,
   wherein the pressurized-stirring part has:
      a cylinder;
      a shaft part which rotates in the cylinder;
      a spiral blade which rotates together with the shaft part in the cylinder and sequentially feeds the milled rice charged from the charging part;
      a projecting strip portion which rotates together with the shaft part in the cylinder and is provided at a rear-stage of the spiral blade;
      a rinsing blade which rotates together with the shaft part in the cylinder and is provided at a rear-stage of the projecting strip portion, and
   the rinsing and stirring part has a blade part which is provided in the cylinder, rotates together with the shaft part, and is provided at a rear-stage of the rinsing blade, wherein the blade part has a configuration in which two semi-circular blades are arranged with centers of the two semi-circular blades being shifted from each other.

2. The rice washer according to claim 1,
   wherein the cylinder includes an inner wall and a cross-sectional shape of the inner wall viewed in an axial direction at a position of the rinsing blade is polygonal, and
   a cross-sectional shape of the cylinder viewed in the axial direction at a position of the blade part is circular.

3. The rice washer according to claim 1, further comprising:
   a first water supply nozzle configured to supply water toward the spiral blade in the cylinder;
   a second water supply nozzle configured to supply water toward the projecting strip portion in the cylinder;
   a third water supply nozzle configured to supply water toward the rinsing blade in the cylinder; and
   a fourth water supply nozzle configured to supply water toward the blade part in the cylinder.

4. The rice washer according to claim 3, further comprising:
   a separation part which is provided at a rear-stage of the rinsing and stirring part to separate the milled rice and the water,
   wherein the separation part includes an inclined surface having a slit for separation to allow passage of the water and prevent passage of the milled rice.

5. The rice washer according to claim 4,
   wherein the separation part further has a flow plate provided outside the inclined surface, and
   the water that has passed through the slit flows along the flow plate.

6. The rice washer according to claim 1,
   wherein a slit is provided on a wall surface of the cylinder for separation to allow water in the cylinder to pass therethrough and prevent passage of the milled rice in the cylinder.

7. The rice washer according to claim 3, further comprising:
   a drain passage configured to receive and discharge the water separated from the milled rice.

* * * * *